March 22, 1966 E. G. BERGENSTEIN 3,242,252
TRANSFORMER FOR UNDERGROUND POWER DISTRIBUTION SYSTEM
Filed Jan. 20, 1964 2 Sheets-Sheet 1

INVENTOR
ERIC GUSTAV BERGENSTEIN
BY Maybee & Legris
ATTORNEYS

March 22, 1966 E. G. BERGENSTEIN 3,242,252
TRANSFORMER FOR UNDERGROUND POWER DISTRIBUTION SYSTEM
Filed Jan. 20, 1964 2 Sheets-Sheet 2

INVENTOR
ERIC GUSTAV BERGENSTEIN
BY Maybee & Legris
ATTORNEYS

United States Patent Office 3,242,252
Patented Mar. 22, 1966

3,242,252
TRANSFORMER FOR UNDERGROUND POWER DISTRIBUTION SYSTEM
Eric Gustav Bergenstein, Fonthill, Ontario, Canada, assignor to Reliance Electric & Engineering (Canada) Limited, York, Ontario, Canada
Filed Jan. 20, 1964, Ser. No. 338,664
Claims priority, application Canada, Feb. 2, 1963, 867,995
6 Claims. (Cl. 174—38)

This invention relates to a transformer for an underground power distribution system and more particularly to a street lamp and transformer combination connected to an underground power distribution system.

Transformers for underground power distribution have generally been of such configurations and sizes that it has not been desirable to locate them on municipal property in front of residences and adjacent to the street. Such transformers have accordingly been placed behind residences, on private property. Some property owners resist having transformers installed on their property, and the transformers are not always easily accessible for routine and emergency maintenance. Sometimes, where buildings have been erected close to the property lines after installation of the transformers, the removal and replacement of the transformers can be difficult. The location of the transformers away from the streets has required additional trenching across private property, or along the street line, to provide electric power for street lighting. Because of the necessity of making all electrical parts inaccessible to children, the design and construction of the transformers has also given rise to problems.

It is an object of this invention to provide a transformer that is suitable for installation along streets having underground power distribution systems. According to the invention, a transformer is made of such size and configuration that it can form part of the length of a slender street lamp post.

Other objects and advantages of the invention are obvious from the following description taken in conjunction with accompanying drawing in which.

Figure 1:
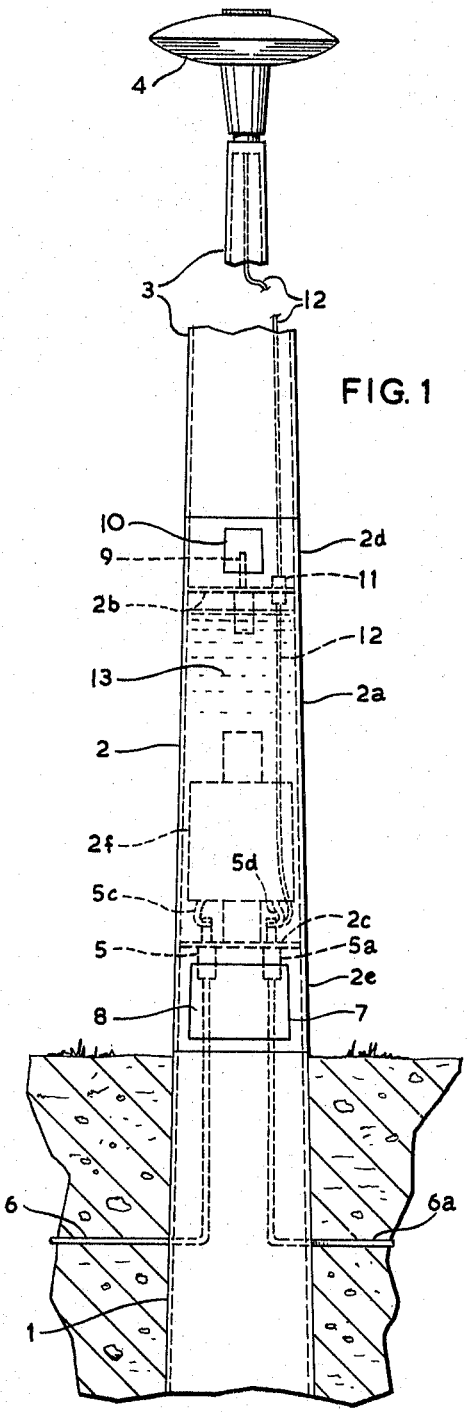
FIGURE 1 illustrates an embodiment of the present invention showing, in elevation, a partly broken away view of a street lamp post which includes a transformer connected into an underground power distribution system.

The lamp post illustrated in FIGURE 1 consists of a buried tubular section 1 and two sections above the ground, namely a lower section 2 and an upper tubular section 3, part of the latter being broken away in the drawing. At its top the post has a lamp 4.

The section 2 of the lamp post consists of a vertically elongated transformer having an elongated tubular casing 2a, the casing having an upper end wall 2b, a lower end wall 2c, an upper tubular extension 2d by which it is mechanically connected to the section 3 and a lower tubular extension 2e by which it is mechanically connected to the buried section 1. The core and windings of the transformer, 2f, are shown in outline. Extending downwardly from its lower end wall 2c the transformer has terminals (indicated by high voltage bushing 5 and low voltage bushing 5a) by which it is connected to the underground power distribution system. Wires 5c and 5d connect the terminals to the high voltage and low voltage windings, respectively, of the transformer. Normally the transformer has two primary winding terminals and two secondary winding terminals, but for simplicity of illustration only two terminals are shown in the drawing. High voltage cables 6 and low voltage cables 6a of the distribution system extend through openings in the section 1 and are connected to the terminals 5 and 5a respectively. Because the post is located on the street it is necessary to lay but one line of primary and secondary cable underground, adjacent to the street.

The extension 2e defines a chamber in which the terminals 5 and 5a are housed outside the casing 2a but within the post. This chamber can be made accessible through an opening 7 which is normally closed by a cover 8.

At its upper end wall 2b the transformer has a terminal 11 for wiring 12 leading from low voltage terminal 5a up to the lamp 4. The upper section 3 can be affixed to section 2 before or after section 2 is erected.

To provide the flexibility of a looped sectionalizing system, which is well understood by those skilled in the art, the transformer has, as an accessory, a switch assembly arranged to provide a number of circuit connections. It can connect the transformer to the cable 6 coming from the left, or to the cable 6 coming from the right, or to both, or it can connect the left and right cables together with or without the transformer being connected. This switch assembly has an actuating handle 9 located in a chamber defined by the upper extension 2d, and the handle 9 is accessible through a normally closed access opening 10 in the post. The switch assembly itself is located within the casing 2 where it is immersed in the bath 13 of oil or other liquid coolant of the transformer. The switch assembly and its handle 9 could of course be located near the lower end of the transformer so that the handle could be reached through the opening 7. The transformer can also be provided with a tap changing switch, immersed in the liquid coolant, and having its handle housed within the post and accessible in the same way as the handle 9.

It will be seen that the core and windings 2f of the transformer, within the casing 2a, are separated from the outside cooling air by only the casing 2a, which may be of metal or plastic construction. Cooling of the transformer is thus provided by a minimum of total radiation surface. The casing 2a constitutes an inconspicuous part of the length of the lamp post, which can have a smooth profile substantially free of externally protruding parts. No bulge is created in the post by the transformer. All live electrical parts are completely encased within the post and the access openings 7 and 10, being very small, can easily be made tamperproof.

Figure 2:
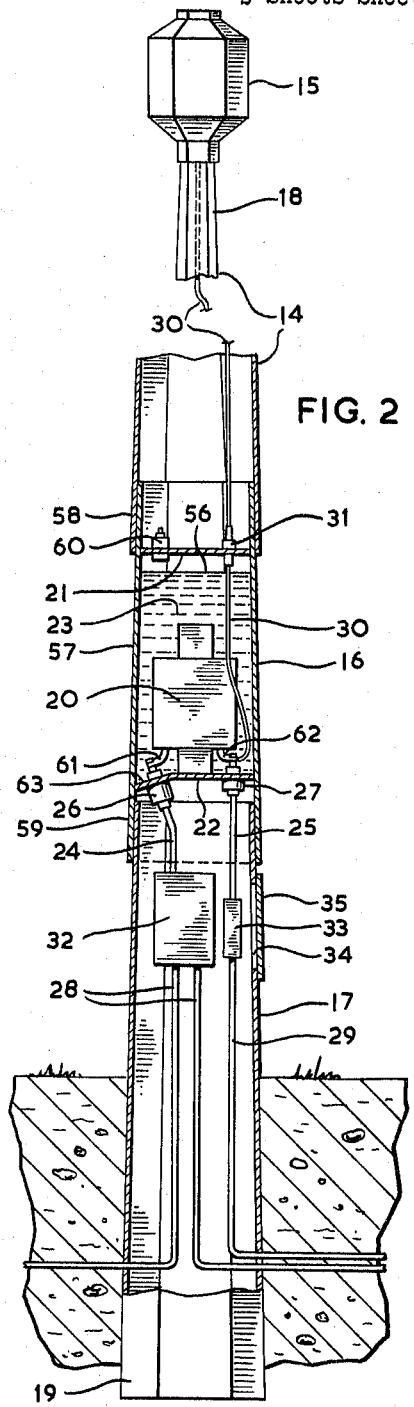
FIGURE 2 illustrates partly in section and partly diagrammatically another embodiment of the invention showing, in elevation, a street lamp post, partly broken away, with transformer contained therein.

As aforementioned, switching means for the transformer can be located near its lower end and FIGURE 2 illustrates such an arrangement, parts of the post being shown in section and the transformer and connections diagrammatically. The lamp post is shown in three sections connected together by overlapped joints illustrated by top section 14, with lamp 15 attached thereto, middle section 16 containing the main transformer components and bottom section 17 with its lower portion buried in the ground. By using overlapping joints, as shown in FIGURE 2, no welding or bolting is required and sections of the post, and especially the transformer section, can be very easily removed for repair or replacement. It can be appreciated that the lamp may have more than three vertical sections connected together to achieve greater height or to shorten the length of sections, if desired. As can be seen by the non-sectionally illustrated portions 18 and 19 of top and bottom sections 14 and 17 respecively, the particular post illustrated has an octagonal configuration.

Figure 3:
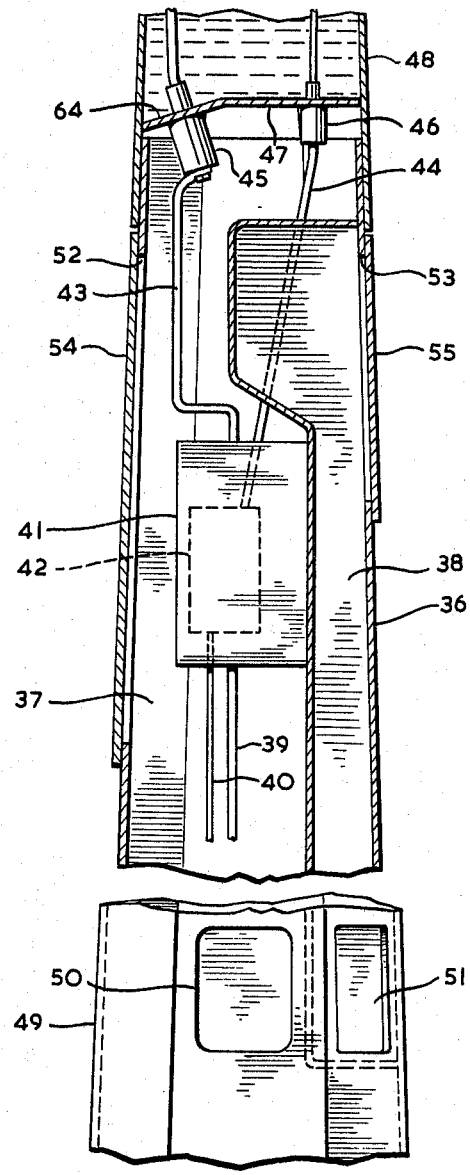
FIGURE 3 shows a portion of a further embodiment of the transformer-lamp post combination containing a separate compartment for telephone terminal block and lines thereto.

In middle section 16 are shown the transformer core and windings 20 of the transformer enclosed by upper and lower end walls 21 and 22 respectively. High voltage conductors 24 and low voltage conductors 25 are shown connected through high and low voltage bushings 26 and 27 respectively to the primary and secondary windings. High voltage cables 28 and low voltage cables 29 are shown running from the ground into the bottom section of the post 17. Low voltage conductor 30 is shown leading from the transformer low voltage terminal through outlet bushing 31 in upper end wall 21 to lamp 15. As distinct from the arrangement shown in FIGURE 1 the high voltage fuse and disconnect switch in high voltage terminal block 32 are located in section 17 below the transformer section 16 with high voltage cables 28 leading thereto. Low voltage terminal block 33 is shown beside high voltage block 32 with low voltage cables 29 leading thereto. With this arrangement all transformer terminals and blocks, switches and fuses can be serviced through opening 34 in the post normally closed by cover plate 35 Other normally closed openings may, of course, be provided at this location in the post The novel transformer lamp post can advantageously be utilized not only to house a transformer and power connections thereto but also to contain a terminal block with lines thereto for a telephone company and FIGURE 3 illustrates such an arrangement showing a separate compartment for the telephone terminal block and associated connecting lines In FIGURE 3 cutaway portions of the bottom section of the post are illustrated with the upper part 36 shown in section and power lines with associated connections and terminal blocks shown diagrammatically. Compartment 37 is seen to be that used for electric power lines and terminal blocks while compartment 38 is utilized for telephone lines and terminal block (not shown). Compartments 37 and 38 are sealed from each other to prevent access between the two. In compartment 37 high voltage cables 39 and low voltage cables 40 are shown running into high voltage and low voltage terminal blocks 41 and 42 respectively. High voltage and low voltage conductors 43 and 44 are shown running therefrom through high and low voltage bushings 45 and 46 respectively, located in lower end wall 47 of the transformer in middle section 48 of the lamp post.

A cutaway portion 49 of the lower part of the bottom section of the lamp post located in the ground is shown in elevation with opening 50, through which high voltage and low voltage lines are fed through the post wall into compartment 37, and opening 51, through which telephone lines are fed into compartment 38, located therein. Electrical terminal blocks and connections are serviced through opening 52 in upper part 36 of the bottom section of the post and the telephone terminal block and connections are serviced through opening 53. These openings are normally closed by cover plates 54 and 55, respectively, which are preferably tamperproof.

Referring in greater detail to the transformer section of the lamp post shown in FIGURE 2, transformer core and windings 20 are shown surrounded by liquid, dielectric cooling bath 23 having upper surface 56 and contained in casing 57 which also forms the wall of the post and has upper and lower end walls 21 and 22 respectively. The lower portion of top section 14 of the post is seen fitted over casing 57 at 58 and casing 57 is shown fitted over the upper portion of bottom section 17 at 59. Oil plug 60 is shown in upper end wall 21. Advantageously this plug has a safety pressure blowout valve contained therein.

High voltage conductor 24 is shown leading up to and through bushing 26 contained in lower end wall 22 and connection 61 leads from bushing 26 to the high voltage windings of the transformer. Low voltage conductor 25 is shown connected to bushing 27 and through connection 62 to the low voltage windings of the transformer. Any or all of the bushings 26, 27 and 31 may be replaced by suitably packed grommets leading through the transformer casing end walls, if so desired.

In order to minimize the thickness of the lamp and so maintain its slender, attractive appearance, the portion 63 of lower end wall 22 through which bushing 26 passes is inclined to keep the lower end of the bushing as far as possible from the wall of the post with the upper portion of the bushing in the liquid coolant closer to the wall. The upper portion of the bushing can be set closer to the wall, of course, because it is surrounded by a liquid coolant which is a much better dielectric than is air. With no inclination in end wall 22 and bushing 26 passing vertically therethrough, in order to have the same distance between high voltage line 24 and the wall of the post the post would require a much larger diameter, thereby detracting from its slender, attractive appearance while at the same time increasing the weight of the post. An inclined portion 64 is also shown in lower end wall 47 of the embodiment shown in FIGURE 3. This technique can also be carried out by having the bushing enter a straight end wall, devoid of any inclined portion, at an angle, with more difficulty, however, in making connections.

The transformer would, of course, normally have two primary and two secondary winding connections but for purposes of simplicity only single primary and secondary connections are shown in FIGURE 3.

It is desirable for the post to be slender, with a slight taper from the ground to the top. The post can be of circular, octagonal, or other cross-sectional shape, but preferably the section 2 should have transverse external dimensions not greatly exceeding one foot for a pleasing appearance. Within this limitation it is quite possible to design and construct a 37½ kva. transformer, of sufficiently small cross-sectional area to be housed in the lamp post, having a 2400 volt primary and a 240/120 volt secondary, able to operate at 100% load continuously with a winding temperature rise within current NEMA standards (65° C.) and having an efficiency of over 98%.

It can be seen that the present invention provides an assembly of electrical elements combining the advantages of utility and pleasing, decorative appearance. Thus, in a slender, attractive lamp post, without being evident, is provided a compact transformer with all wires, connections, fuses and terminal boxes, including those to the lamp, contained within the post and connected to an underground circuit. At the same time all terminal connections, fuses and switches are made accessible from the ground with the transformer assembly being easily removed as one complete section of the post. The flexibility of a looped sectionalizing system, if desired, can be incorporated in the switching set-up within the post, allowing repairs and replacements of transformer and accessories with no interruptions to the rest of the surrounding circuits. The present invention further provides, if desired, a compartment for a telephone line terminal box within the same, slender lamp post with connections running thereto, also within the post, from underground wiring.

What I claim as my invention is:

1. A transformer and lamp post in combination comprising a plurality of substantially straight line sections located one above the other and attached together to form a slender, substantially straight line lamp post, the outer surface of which is substantially free of conspicuous bulges and protrusions, one of said sections being readily removable and comprising an elongated, tubular casing, upper and lower end walls sealing the casing, a transformer assembly and a liquid, dielectric coolant for the transformer within the casing, the wall of the casing being the wall of the post and the transformer, high voltage and low voltage conductors connected to the primary and secondary windings of said transformer through high voltage and low voltage bushings located on an end wall of said casing, said bushings having terminals in the casing in dielectric coolant and terminals outside the casing and being sealed to the casing to prevent leakage of the liquid coolant, said high voltage bushing being adapted at an angle to the wall of the tubular casing in the end wall to locate the terminal of said high voltage bushing in the dielectric coolant closer to the casing wall than the terminal of said high voltage bushing outside the tubular casing, another of said sections containing terminals and terminal blocks adapted to be connected to the conductors to the primary and secondary windings of said transformer and having at least one normally closed opening therein for access to said terminals and terminal blocks without disturbing said transformer section, a third section on the upper end of said lamp post having at least one lamp attached thereto and connected through the post to the low voltage terminal of said transformer, switching and fuse means within a section of said post connected to said transformer with access thereto through at least one normally closed opening in said post, and at least one opening at the lower end of said post for connections from the terminals to an underground power distribution system.

2. A transformer and lamp post combination as claimed in claim 1 wherein the straight line sections, including the casing containing the transformer assembly, are connected together by joints overlapping from top to bottom.

3. A transformer and lamp post in combination as claimed in claim 1 wherein the high voltage bushing is adapted at an angle in at least a portion of the end wall inclined from the horizontal.

4. A transformer and lamp post combination as claimed in claim 2 wherein all terminals, terminal blocks, switches and fuses are located in one section below the transformer section to allow access thereto from one location on the post through at least one normally closed opening therein.

5. A transformer and lamp post combination as claimed in claim 2 wherein all terminals, terminal blocks, switches and fuses are located in one section below the transformer section, said one section also contains a separate compartment for a telephone line terminal block and the post contains separate access means for telephone lines attached to said telephone line terminal block.

6. A transformer, lamp post and telephone line terminal compartment in combination comprising at least three substantially straight line sections of post located one above the other and including an upper section, a centre section and a lower section, attached together by joints overlapping from the top down to form a slender, substantially straight line lamp post substantially free of bulges or protrusions, the centre section being readily removable in one assembly and comprising an elongated, tubular casing, upper and lower end walls sealing the casing, a transformer assembly and a liquid, dielectric coolant for the transformer within the casing, the wall of said centre section being the wall of the post and the transformer, high voltage and low voltage conductors connected to the primary and secondary windings of said transformer through high voltage and low voltage bushings located on the lower end wall of said casing, said bushings having terminals within the casing in dielectric coolant and terminals outside the casing and being sealed to the casing to prevent leakage of liquid coolant therefrom, at least a portion of said lower end wall being inclined downwardly from the horizontal with high voltage bushings connected therein to locate the terminals of said high voltage bushings in the dielectric coolant closer to the casing wall than the terminals of said high voltage bushings outside the tubular casing and thereby effecting minimum thickness of said post, the lower section of the post containing fuses and switches for said transformer and also containing electrical terminals and terminal blocks adapted to be connected to the conductors to the primary and secondary windings of said transformer, and a separate compartment in said lower section of post adapted to receive a telephone line terminal block, said lower section having at least one normally closed opening therein for access to said fuses, switches, electrical terminals and terminal blocks without disturbing said transformer section, and at least one other normally closed opening therein for access to said separate compartment, the upper section of the post having at least one lamp attached thereto and connected through the post to the low voltage terminal of said transformer, and access openings at the lower end of said post for connecting lines from the electrical terminals to an underground power distribution system and for telephone lines attaching said telephone line terminal block to an underground telephone line distributing system.

References Cited by the Examiner

UNITED STATES PATENTS

| | | | |
|---|---|---|---|
| 342,552 | 5/1886 | Westinghouse | 174—38 X |
| 1,162,657 | 11/1915 | Schweitzer | 174—45 X |
| 1,777,509 | 10/1930 | Underwood | 240—84 |
| 1,807,413 | 5/1931 | King | 240—84 |

ROBERT K. SCHAEFER, *Primary Examiner.*

JOHN F. BURNS, *Examiner.*

J. F. RUGGIERO, *Assistant Examiner.*